THOMAS S. LINES, OF NEWCASTLE, INDIANA.

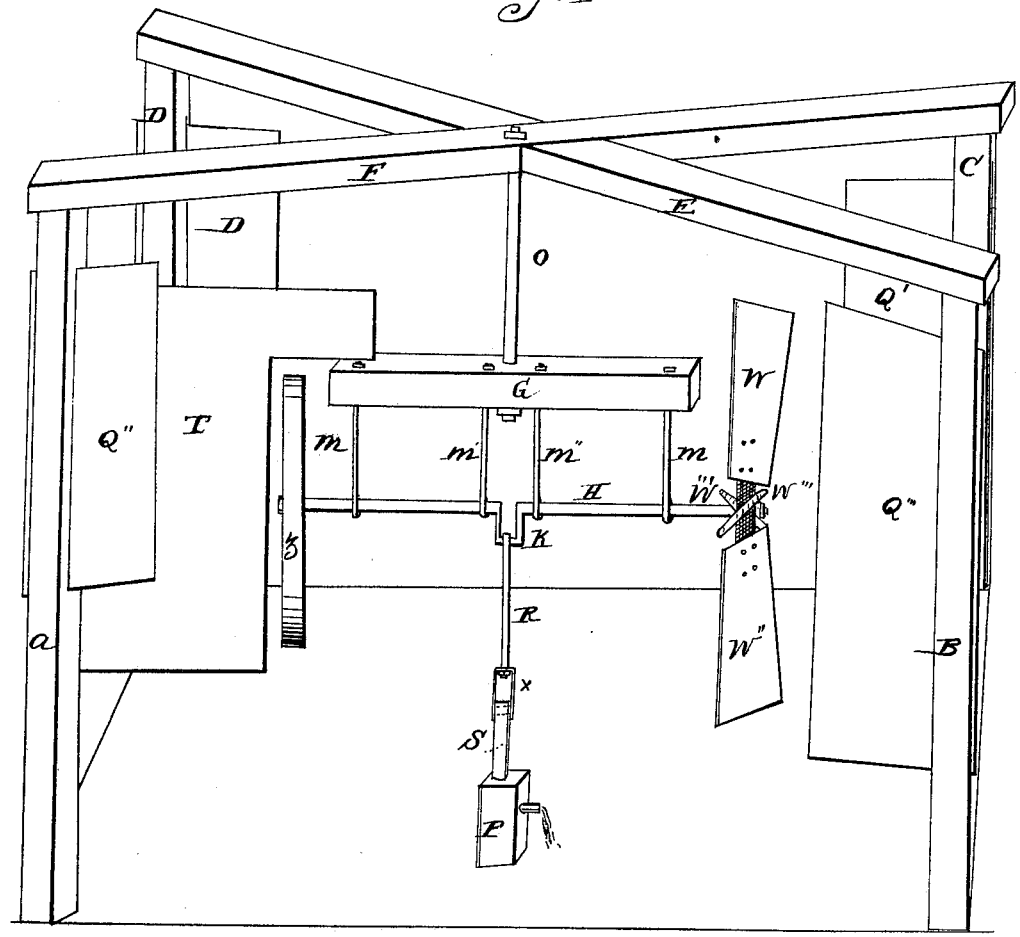

Letters Patent No. 91,457, dated June 15, 1869.

IMPROVEMENT IN WIND-WHEELS.

The Schedule referred to in these Letters Patent and making part of the same.

*To all whom it may concern:*

Be it known that I, THOMAS S. LINES, of Newcastle, in Henry county, State of Indiana, have invented a new and useful Improvement on Wind-Wheels for Operating Pumps and analogous purposes; and I do hereby declare that the following is a full, clear, and exact description of the construction and operation of the same, reference being had to the annexed drawings, making a part of this specification, in which—

Figure 1 is a perspective view.

A B C D are posts supporting the cross-beams E and F.

From E and F, at their intersection, is suspended, on a rod, O, the cross-head G, which revolves on rod O, as its axis, horizontally.

From the cross-head G, the axle H is suspended by the four rods or bearings M M' M'' M'''.

In the middle of said axle is a bend or crank, K, on which the shaft R works, which is connected to shaft S of pump by a swivel-joint at X.

On the right-hand end of axle H is the wind-wheel W W'' W''' W'''', and on the other end a balance-wheel, Z.

T is the vane, by which the wheel W, W'', &c., is kept in proper position to receive the force of the wind.

Q Q' Q'' Q''' are guides fastened to posts, at an angle of ninety degrees to each other, to direct the wind more forcibly on the wheel W, W', &c.

P is the pump.

The wind operating on the wheel W, W'', &c., revolves the axle H, which gives to the shaft R a vertical motion, such as is required in ordinary pumps.

The wind-wheel W W'' W''' W'''' itself, separate and apart from the other devices herein named, is disclaimed; it being intended only to claim the mode of supporting said parts and the mode of directing the force of the wind thereon.

What I claim as my invention, and desire to secure by Letters Patent, is—

1. The frame A B C D, with cross-beams E F, cross-head G, rod O, axle H, balance-wheel Z, supported by rods M M' M'' M''', when combined and used with wind-wheel W W' W'' W''', substantially as and for the purposes set forth.

2. The guides Q Q' Q'' Q''', in combination with the frame A B C D, and the other parts of said machine, when used in combination with wind-wheel W W' W'' W''', substantially as and for the purposes set forth.

THOS. S. LINES.

Witnesses:
   DANIEL NEWBY,
   JACOB R. SHIRK.